(12) United States Patent
Bajko

(10) Patent No.: US 8,463,175 B2
(45) Date of Patent: Jun. 11, 2013

(54) METHOD, APPARATUS, AND COMPUTER PROGRAM PRODUCT FOR WIRELESS NETWORK DISCOVERY THROUGH PASSIVE AND ACTIVE SCANNING

(75) Inventor: Gabor Bajko, Sunnyvale, CA (US)

(73) Assignee: Nokia Corporation, Espoo (FI)

( * ) Notice: Subject to any disclaimer, the term of this patent is extended or adjusted under 35 U.S.C. 154(b) by 67 days.

(21) Appl. No.: 13/234,463

(22) Filed: Sep. 16, 2011

(65) Prior Publication Data
US 2013/0072248 A1  Mar. 21, 2013

(51) Int. Cl.
*H04H 20/74* (2008.01)
*H04L 12/28* (2006.01)
*H04B 7/00* (2006.01)
*H04W 4/00* (2009.01)

(52) U.S. Cl.
USPC ....... 455/3.02; 455/404.1; 370/254; 370/310; 370/338; 379/45

(58) Field of Classification Search
USPC .. 455/3.02, 404.1; 370/254, 310, 338; 379/45
See application file for complete search history.

(56) References Cited

U.S. PATENT DOCUMENTS

| 8,059,622 | B2* | 11/2011 | Zhu | 370/338 |
| 8,085,737 | B2* | 12/2011 | Zhu | 370/336 |
| 8,107,956 | B2* | 1/2012 | Vakil et al. | 455/435.1 |
| 8,326,221 | B2* | 12/2012 | Dorsey | 455/41.1 |
| 8,363,586 | B2* | 1/2013 | Rosario et al. | 370/312 |
| 2008/0151796 | A1 | 6/2008 | Jokela | |
| 2009/0010399 | A1 | 1/2009 | Kim et al. | |
| 2009/0245133 | A1 | 10/2009 | Gupta et al. | |
| 2009/0282102 | A1* | 11/2009 | Geurts et al. | 709/204 |
| 2011/0022655 | A1* | 1/2011 | Pinnick et al. | 709/203 |
| 2012/0044915 | A1* | 2/2012 | Oerton | 370/338 |
| 2013/0001298 | A1* | 1/2013 | Reblin | 235/375 |

OTHER PUBLICATIONS

Wi-Fi Alliance Technical Committee P2P Task Group Wi-Fi Peer-to-Peer (P2P) Technical Specification Version 1.1, 2010.
IEEE 802.11u-2011, Wireless LAN Medium Access Control (MAC) and Physical Layer (PHY) Specifications, Amendment 9: Interworking with External Networks, Feb. 25, 2011.
Minghui Shi, et al. "IEEE802.11 Roaming and Authentication in Wireless LAN/Cellular Mobile Networks", IEEE Wireless Communications • Aug. 2004, pp. 66-75.

(Continued)

Primary Examiner — Bobbak Safaipour
(74) Attorney, Agent, or Firm — Locke Lord LLP

(57) ABSTRACT

Method, apparatus, and computer program product embodiments of the invention are disclosed to improve the discovery of wireless networks having desired service offerings. In example embodiments of the invention, a method comprises: determining whether to perform passive or active scanning; transmitting a wireless generic advertisement service request specifying one or more required characteristics of a transmitting device, if the determination is to perform active scanning; passively listening for one or more wireless generic advertisement service responses sent to a broadcast address by one or more wireless devices, the responses including one or more required characteristics of a passive listening device, if the determination is to perform passive scanning; and receiving one or more wireless generic advertisement service responses sent to a broadcast address by one or more wireless devices having the characteristics specified in the transmitted request.

5 Claims, 15 Drawing Sheets

OTHER PUBLICATIONS

Elias C. Efstathiou, et al.,."A Peer-to-Peer Approach to Wireless LAN Roaming" In Proceedings of the First ACM International Workshop on Wireless Mobile Applications and Services on WLAN Hotspots, pp. 10-18, San Diego, CA, 2003.

M. Buddhikot, et al., "Integration of 802.11 and Third-Generation Wireless Data Networks", IEEE INFOCOM 2003, 10 pp.

M. Emmelmann; Fraunhofer Fokus & Root, Inc: Optimised networks selection; 11-11-1015-01-00ai, IEEE-SA Mentor, Piscataway, NJ, USA vol. 802.11ai, No. 1; Jul. 21, 2011, pp. 2-6, XP017674023.

D. Stephenson, et al., (Cisco Systems) Gas Update to 802.11u-D1.0; IEEE-SA Mentor, Piscataway, NJ, USA, Nov. 12, 2007, pp. 1-37, XP017683043.

G. Bajko, et al., (Nokia) Network Selection Optimization; IEEE 802.11-11.1015r1, IEEE-SA Mentor, Piscataway, NJ, USA, Sep. 19, 2011, pp. 1-12, XP017674022.

Extended European Search Report for EP Application No. 12183646.4-2412, Search completed Oct. 26, 2012.

* cited by examiner

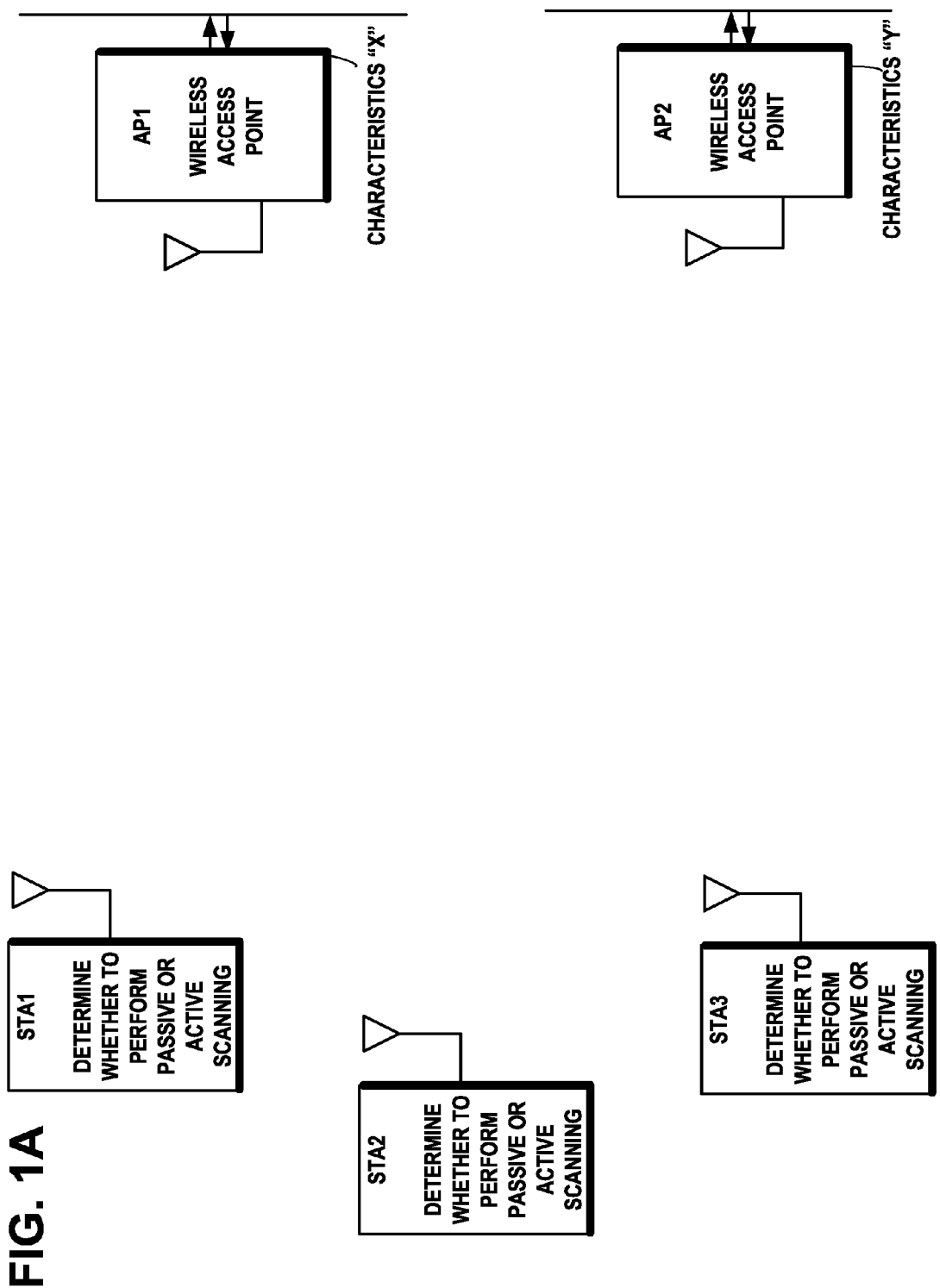

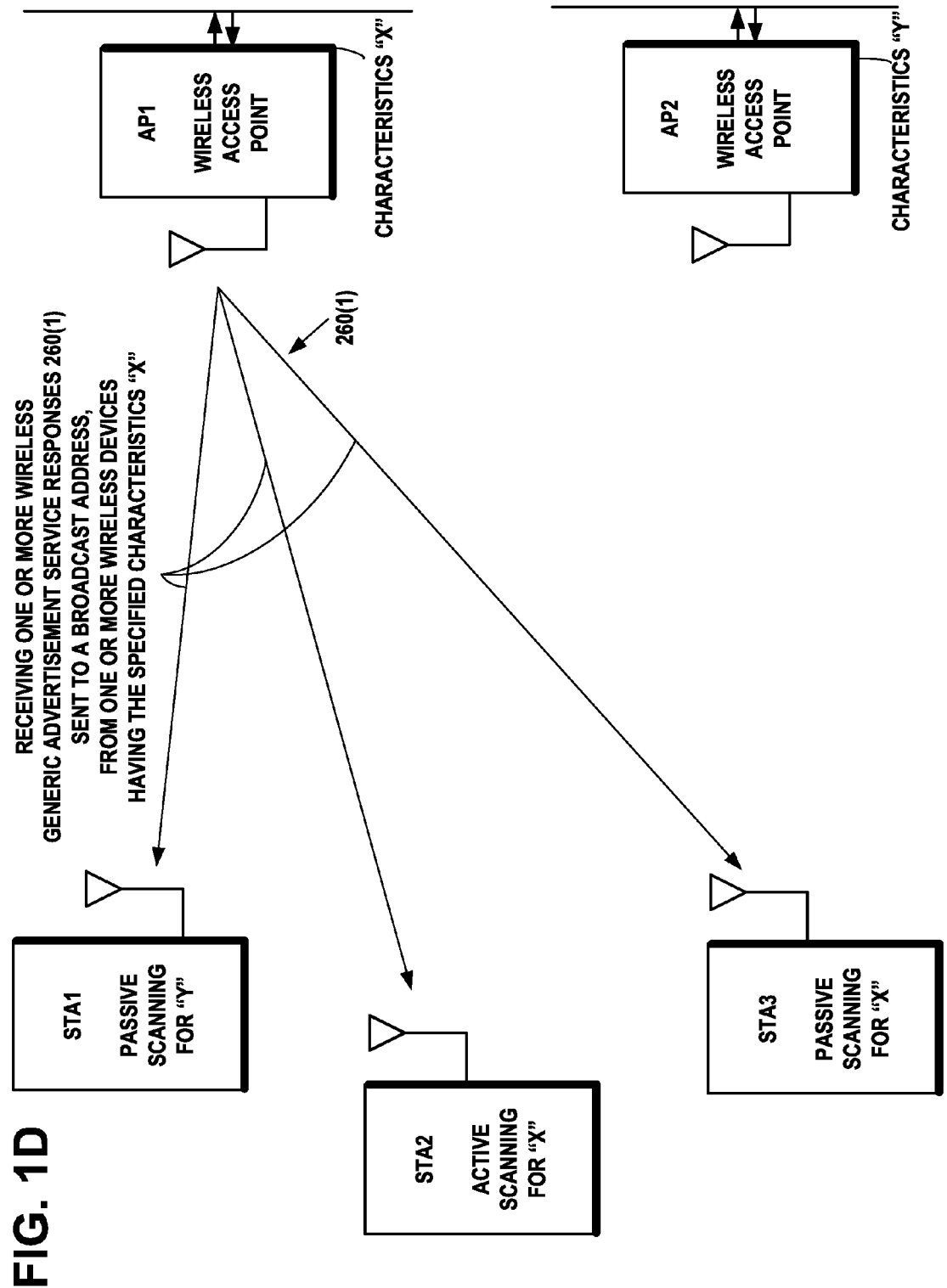

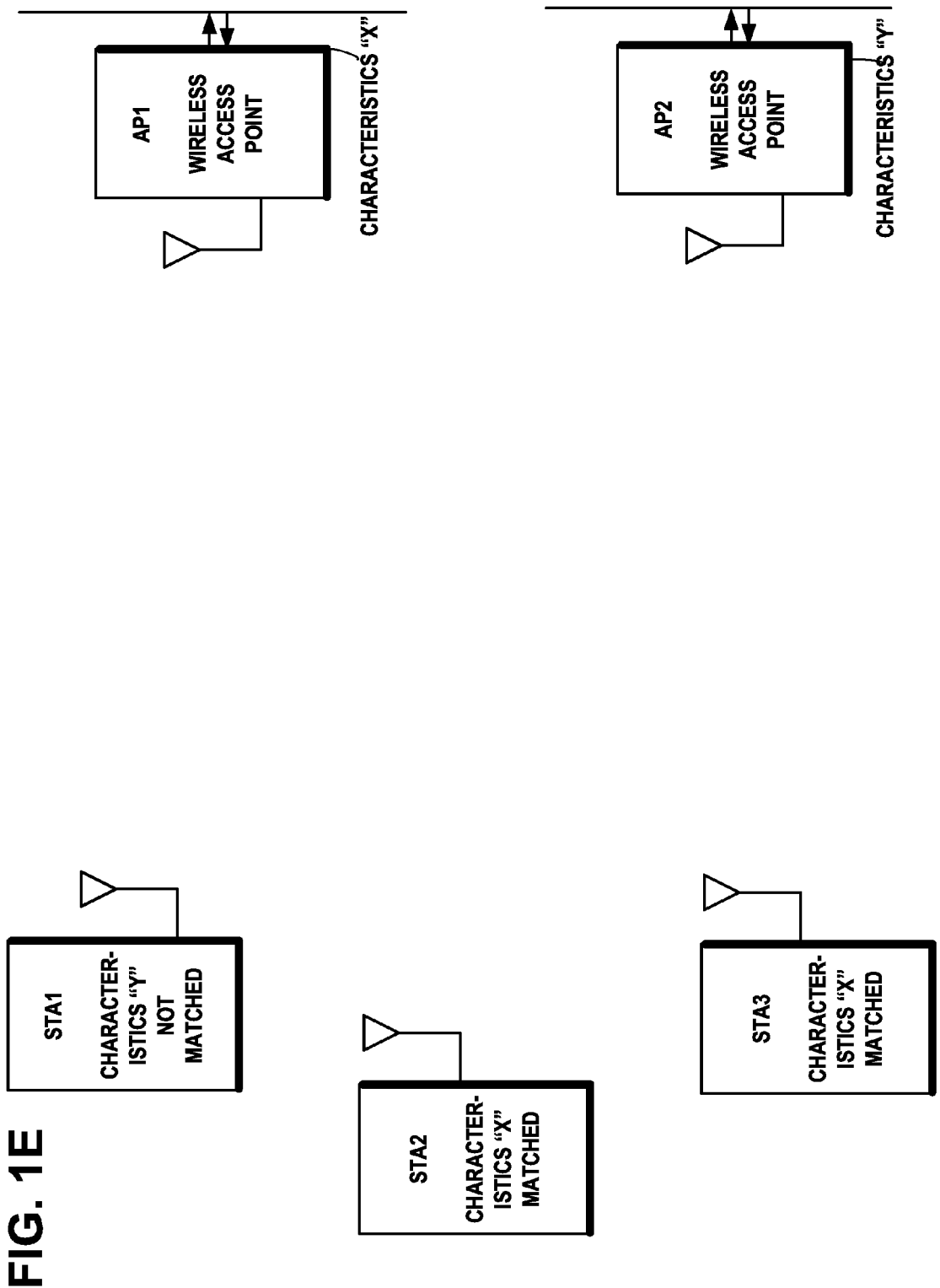

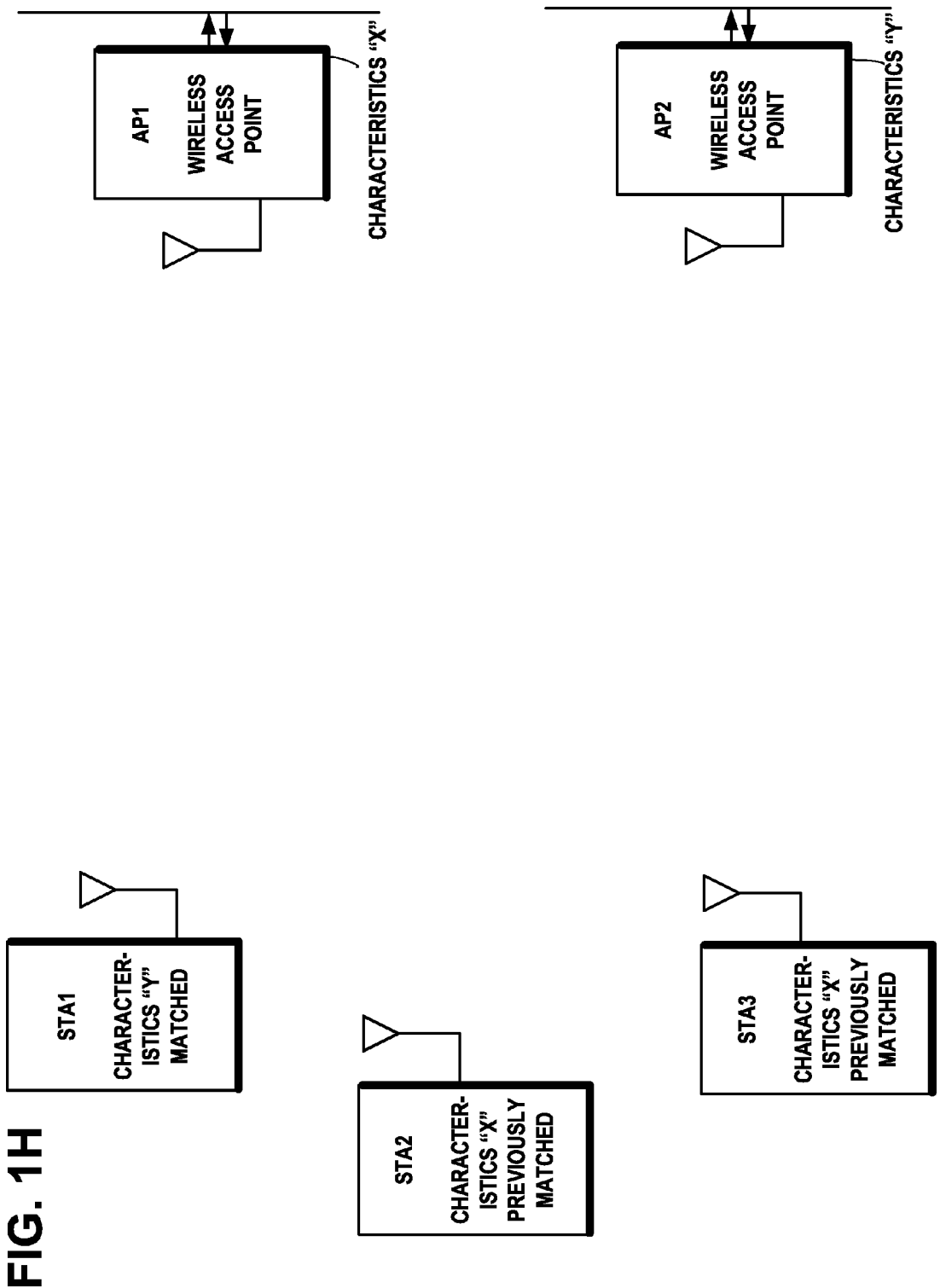

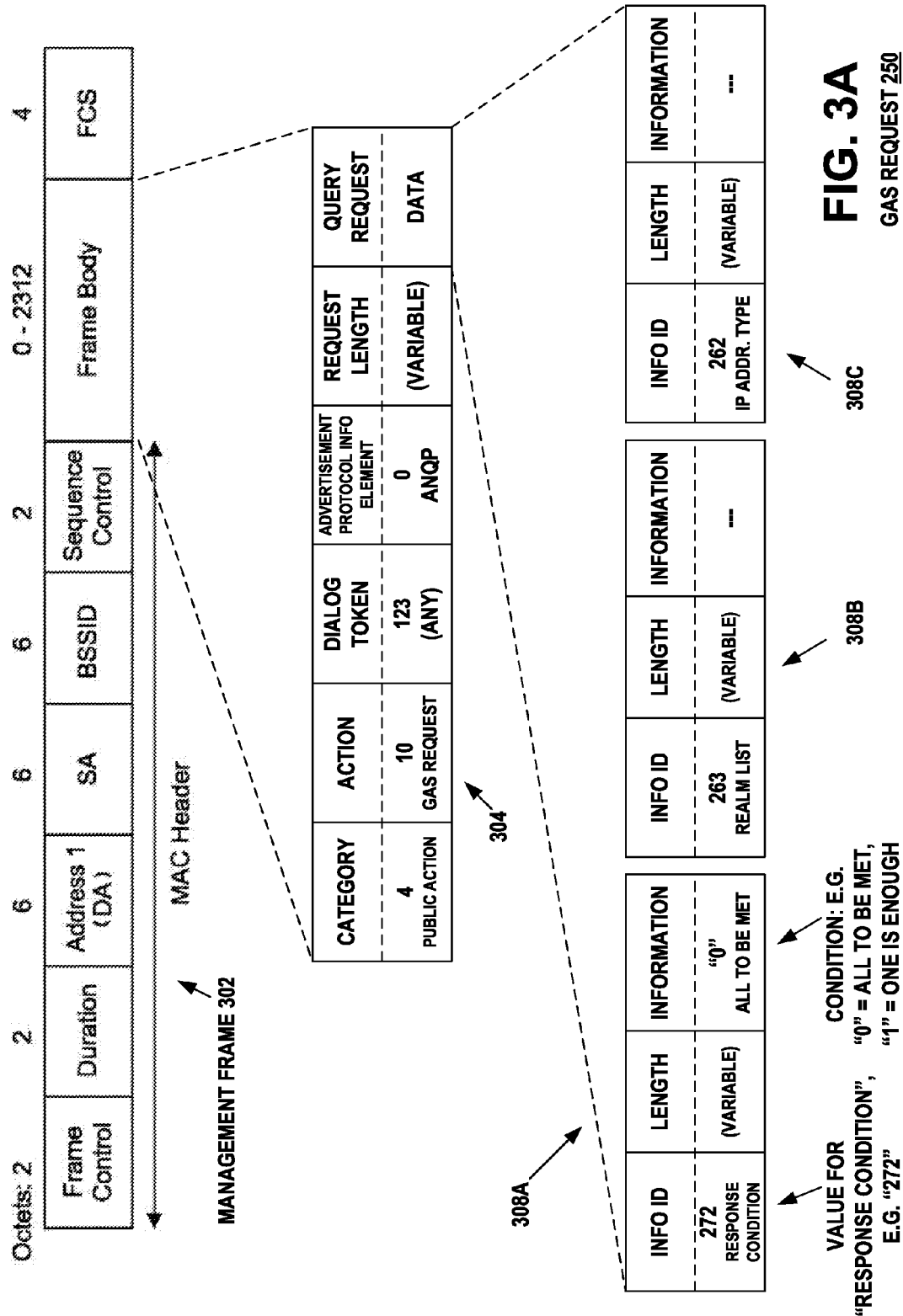

BROADCAST GAS RESPONSE 260

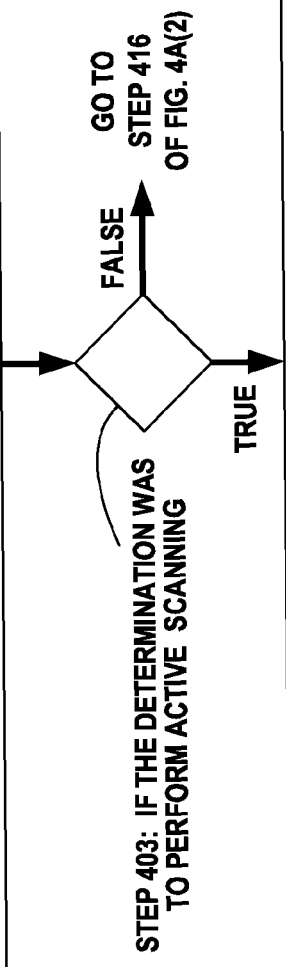

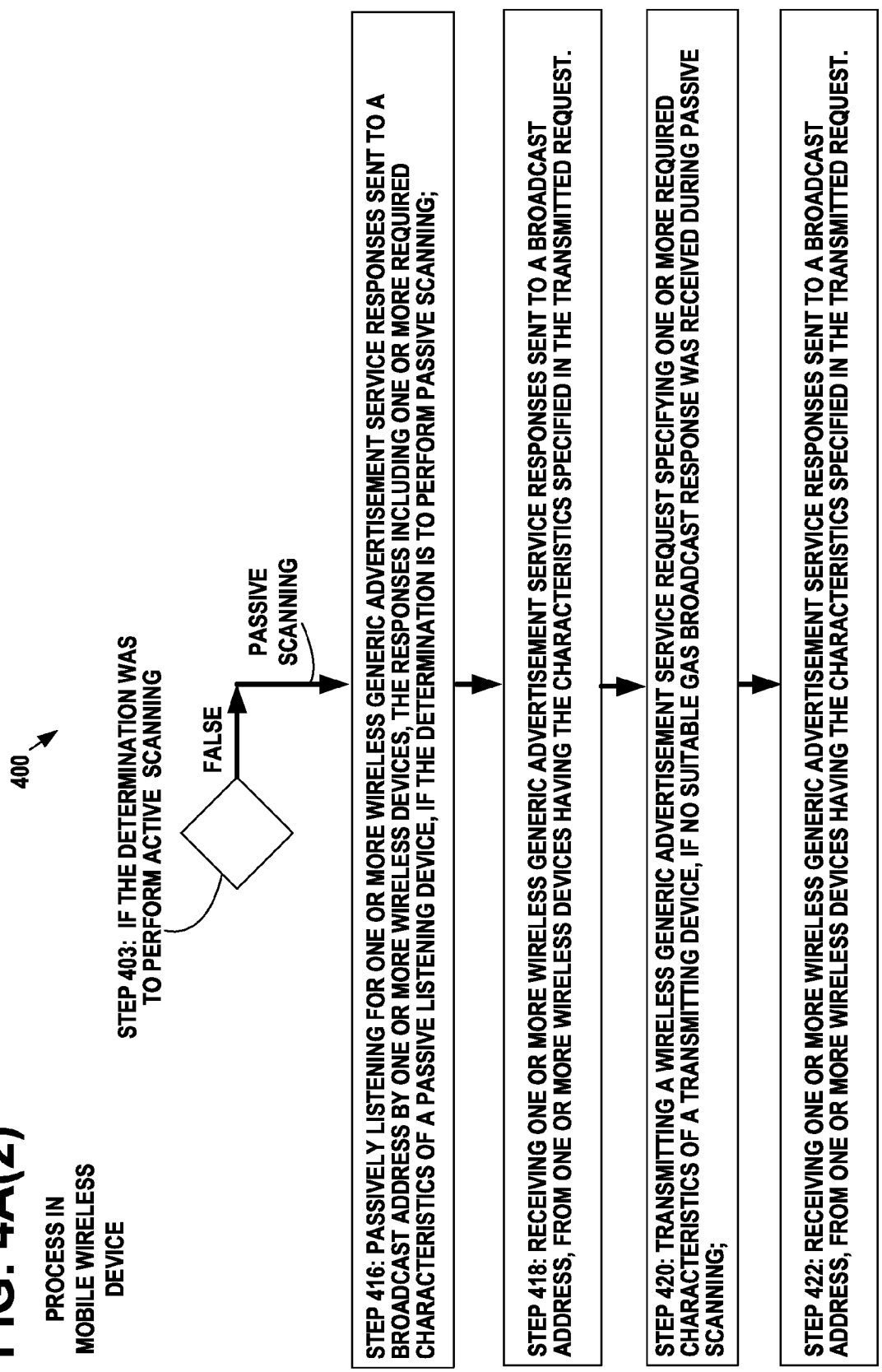

FIG. 4B

PROCESS IN ACCESS POINT

450

STEP 452: RECEIVING A WIRELESS GENERIC ADVERTISEMENT SERVICE REQUEST SPECIFYING ONE OR MORE REQUIRED CHARACTERISTICS; AND

STEP 454: TRANSMITTING ONE OR MORE WIRELESS GENERIC ADVERTISEMENT SERVICE RESPONSES TO A BROADCAST ADDRESS, BASED ON HAVING THE SPECIFIED CHARACTERISTICS.

METHOD, APPARATUS, AND COMPUTER PROGRAM PRODUCT FOR WIRELESS NETWORK DISCOVERY THROUGH PASSIVE AND ACTIVE SCANNING

FIELD

The embodiments relate to wireless communication, and more particularly to improvements in discovering wireless networks having desired service offerings.

BACKGROUND

Modern society has adopted, and is becoming reliant upon, wireless communication devices for various purposes, such as connecting users of the wireless communication devices with other users. Wireless communication devices can vary from battery powered handheld devices to stationary household and/or commercial devices utilizing an electrical network as a power source. Due to rapid development of the wireless communication devices, a number of areas capable of enabling entirely new types of communication applications have emerged.

Cellular networks facilitate communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHZ/1.8 GHZ bands in Europe and at 850 MHz and 1.9 GHZ in the United States. While long-range communication networks, like GSM, are a well-accepted means for transmitting and receiving data, due to cost, traffic and legislative concerns, these networks may not be appropriate for all data applications.

Short-range communication technologies provide communication solutions that avoid some of the problems seen in large cellular networks. Bluetooth™ is an example of a short-range wireless technology quickly gaining acceptance in the marketplace. In addition to Bluetooth™ other popular short-range communication technologies include Bluetooth™ Low Energy, IEEE 802.11 wireless local area network (WLAN), Wireless USB (WUSB), Ultra Wide-band (UWB), ZigBee (IEEE 802.15.4, IEEE 802.15.4a), and ultra high frequency radio frequency identification (UHF RFID) technologies. All of these wireless communication technologies have features and advantages that make them appropriate for various applications.

SUMMARY

Method, apparatus, and computer program product embodiments of the invention are disclosed to improve the discovery of wireless networks having desired service offerings. In example embodiments of the invention, a method comprises: determining, at a wireless device, whether to perform passive or active scanning; transmitting a wireless generic advertisement service request specifying one or more required characteristics of a transmitting device, if the determination is to perform active scanning; passively listening for one or more wireless generic advertisement service responses sent to a broadcast address by one or more wireless devices, the responses including one or more required characteristics of a passive listening device, if the determination is to perform passive scanning; and receiving one or more wireless generic advertisement service responses sent to a broadcast address by one or more wireless devices having the characteristics specified in the transmitted request.

An example embodiment of the invention further comprises a method wherein if the determination was to perform passive scanning and if the characteristics received in the responses do not match the required characteristics of a passive listening device;

then transmitting a wireless generic advertisement service request specifying one or more required characteristics of the passive listening device.

An example embodiment of the invention further comprises a method wherein some of the one or more wireless devices are access points having the specified characteristics.

An example embodiment of the invention further comprises a method wherein the determining further comprises:
creating a random value;
comparing the random value with a selection value; and
choosing whether to perform passive or active scanning based on the comparison of the random value with the selection value.

An example embodiment of the invention further comprises a method wherein the determining further comprises:
creating a random value with a random value a random number generator $y=R(x) \bmod z$, with R being the random number generator with a seed value input x, and z an integer;
performing active scanning when the random number y compares with a selection value; and
if the random number y is not equal to the selection value, then performing passive scanning for all other values of the random number.

An example embodiment of the invention further comprises a method wherein the passively listening further comprises:
collaborating with other wireless devices that randomly choose to actively scan for wireless devices having the specified characteristics.

In example embodiments of the invention, an apparatus comprises:
at least one processor;
at least one memory including computer program code;
the at least one memory and the computer program code configured to, with the at least one processor, cause the apparatus at least to:
determine whether to perform passive or active scanning;
transmit a wireless generic advertisement service request specifying one or more required characteristics of a transmitting device, if the determination is to perform active scanning;
passively listen for one or more wireless generic advertisement service responses sent to a broadcast address by one or more wireless devices, the responses including one or more required characteristics of a passive listening device, if the determination is to perform passive scanning; and
receive one or more wireless generic advertisement service responses sent to a broadcast address by one or more wireless devices having the characteristics specified in the transmitted request.

An example embodiment of the invention further comprises a computer program product comprising computer executable program code recorded on a computer readable, non-transitory storage medium, the computer executable program code, when executed by a computer processor, comprising:
code for determining, at a wireless device, whether to perform passive or active scanning;

code for transmitting a wireless generic advertisement service request specifying one or more required characteristics of a transmitting device, if the determination is to perform active scanning;

code for passively listening for one or more wireless generic advertisement service responses sent to a broadcast address by one or more wireless devices, the responses including one or more required characteristics of a passive listening device, if the determination is to perform passive scanning; and code for receiving one or more wireless generic advertisement service responses sent to a broadcast address by one or more wireless devices having the characteristics specified in the transmitted request.

In example embodiments of the invention, a method comprises:

receiving a wireless generic advertisement service request specifying one or more required characteristics; and transmitting one or more wireless generic advertisement service responses to a broadcast address, based on having the specified characteristics.

In example embodiments of the invention, an apparatus comprises:

at least one processor;

at least one memory including computer program code;

the at least one memory and the computer program code configured to, with the at least one processor, cause the apparatus at least to:

receive a wireless generic advertisement service request specifying one or more required characteristics; and transmit one or more wireless generic advertisement service responses to a broadcast address, based on having the specified characteristics.

An example embodiment of the invention further comprises a computer program product comprising computer executable program code recorded on a computer readable, non-transitory storage medium, the computer executable program code, when executed by a computer processor, comprising:

code for receiving a wireless generic advertisement service request specifying one or more required characteristics; and code for transmitting one or more wireless generic advertisement service responses to a broadcast address, based on having the specified characteristics.

In this manner, embodiments of the invention improve the discovery of wireless networks having desired service offerings.

DESCRIPTION OF THE FIGURES

FIG. 1A illustrates an example wireless network diagram of three mobile wireless devices in communication range of two access points, wherein each of the mobile wireless devices wishes to connect to one of the available access points and needs to discover whether any of the access points available at the current location have one or more required characteristics. The figure shows each of the three mobile wireless devices determining whether to perform passive or active scanning for an access point by making a random choice of one or the other scanning mode, in accordance with an example embodiment of the invention.

FIG. 1D illustrates the example wireless network diagram of FIG. 1C, wherein each of the three mobile wireless devices is shown receiving one or more wireless generic advertisement service (GAS) responses sent to a broadcast address, from one of the access points that has the one or more required characteristics "X", in accordance with an example embodiment of the invention.

FIG. 1E illustrates the example wireless network diagram of FIG. 1D, wherein the mobile wireless device in the active scanning mode is able to match the characteristics "X" received in the generic advertisement service responses, with its required characteristics that were specified in the transmitted request and one of the mobile wireless devices in the passive scanning mode is able to match the characteristics "X" received in the generic advertisement service responses, with its required characteristics "X", whereas the other of the mobile wireless device in the passive scanning mode is not able to match the characteristics "X" received in the generic advertisement service responses, with its required characteristics "Y", in accordance with an example embodiment of the invention.

FIG. 1H illustrates the example wireless network diagram of FIG. 1G, wherein the mobile wireless device in the other of the mobile wireless devices in the passive scanning mode is able to match the characteristics "Y" received in the generic advertisement service responses, with its required characteristics "Y", in accordance with an example embodiment of the invention.

FIG. 3A illustrates an example frame body format of the Generic Advertisement Service (GAS) Initial Request Frame, in accordance with an example embodiment of the invention.

FIGS. 4A(1) and 4A(2) illustrate an example flow diagram of operational steps of an example embodiment of the procedure performed in the mobile wireless device, according to an embodiment of the present invention.

FIG. 4B is an example flow diagram of operational steps of an example embodiment of the procedure performed in the access point device, according to an embodiment of the present invention.

DISCUSSION OF EXAMPLE EMBODIMENTS

Figure 1B:
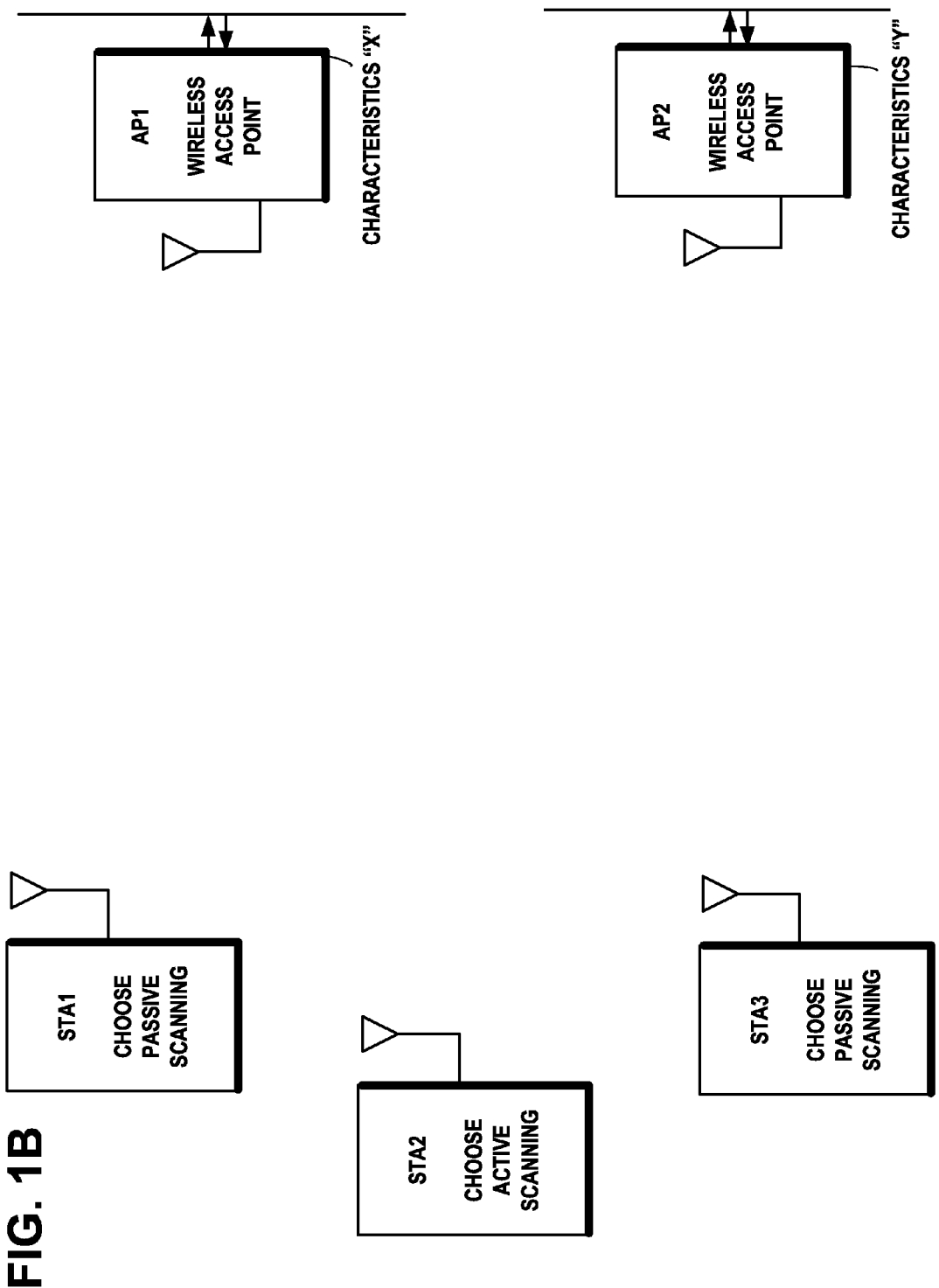
FIG. 1B illustrates the example wireless network diagram of FIG. 1A, showing the result each device's determination, wherein one of the mobile wireless devices has randomly chosen the active scanning mode and the other two mobile wireless devices have randomly chosen the passive scanning mode, in accordance with an example embodiment of the invention.

An example wireless network, such as a Wireless Local Area Network (WLAN) may be organized as an independent basic service set (IBSS) or an infrastructure basic service set (BSS). Wireless devices in an independent basic service set (IBSS) communicate directly with one another and there is no access point in the IBSS. An infrastructure basic service set (BSS) includes a wireless access point (AP) that may be connected to one or more servers and peripheral devices by a wired backbone connection. In an infrastructure BSS, the access point is a central hub to which mobile wireless devices are wirelessly connected. The mobile wireless devices typically do not communicate directly with one another, but communicate indirectly through the access point. An access point may be connected to other access points by a wired backbone connection in an extended service set (ESS). Mobile wireless devices may roam from one wireless connection with one access point to a second wireless connection with a second access point in the ESS, and still be linked to the first access point in the ESS via the wired backbone connection. The user's mobile wireless device is typically authenticated to connect with any of the access points in the ESS, in what is referred to as the user's home realm. "Home realm" is the network where the user's WLAN subscription credentials are valid. There may be multiple subscriptions and the mobile device may consider multiple realms as home realms.

When the user of a mobile wireless device wants to connect to an access point, there are a few possibilities: The device can try to find a free WLAN network (which may be cumbersome, as free WLAN networks usually require the user to launch the browser and accept terms and conditions, a step which the device can not do automatically and seamlessly to the user), or use one of the existing credentials it has. To connect to a WLAN network with existing credentials, the device has these two possibilities: [1] The wireless device may connect to an access point in a network belonging to the home realm to which the user has credentials; [2] The wireless device may connect to an access point in a WLAN belonging to a remote realm to which the user's home realm has a roaming agreement enabling the user to use the home realm's credentials. If existing device credentials can not be used with any of the available networks, the mobile wireless device may attempt to buy a subscription from an access point in a WLAN belonging to a remote realm for which there is no roaming agreement with any of the home realms the credentials the user/device possesses belong to. From convenience and seamless operation point of view, it is desirable that the device attempts to use existing credentials to connect to one of the available access points. During the procedure for selecting an access point, the mobile wireless device needs to discover whether any of the access points available at the current location belong to the (at least one of the) user possessed credential's home realm, or whether the remote realm to which an access point is connected has a roaming agreement with any of those home realm.

The IEEE 802.11 standard specifies methods and techniques of wireless local area network (WLAN) operation. Examples include the IEEE 802.11b and 802.11g wireless local area network specifications, which have been a staple technology for traditional WLAN applications in the 2.4 GHz ISM band. The various amendments to the IEEE 802.11 standard were consolidated for IEEE 802.11a, b, d, e, g, h, i, j protocols, into the base standard IEEE 802.11-2007, Wireless Medium Access Control (MAC) and Physical Layer (PHY) Specifications, June 2007 (incorporated herein by reference). Since then, emerging broadband applications have stimulated interest in developing very high-speed wireless networks for short range communication, for example, the IEEE 802.11n, the planned IEEE 802.11ac, and the planned IEEE 802.11ad WLAN specifications that are to provide a very high throughput in higher frequency bands. Applications of these IEEE 802.11 standards include products such as consumer electronics, telephones, personal computers, and access points for both for home and office.

IEEE 802.11u-2011 is an amendment to the IEEE 802.11-2007 base standard published as *IEEE 802.11u-2011, Wireless LAN Medium Access Control (MAC) and Physical Layer (PHY) Specifications, Amendment 9: Interworking with External Networks*, Feb. 25, 2011 (incorporated herein by reference). IEEE 802.11u-2011 adds features to improve interworking with external networks. IEEE 802.11u-2011 amendment establishes medium access control (MAC) and physical layer (PHY) protocols for an interworking service to permit a wireless mobile device to exchange information with an external network, to enable the selection of networks to connect to, and to enable access to emergency services. A Generic Advertisement Service (GAS) is specified in the IEEE 802.11u amendment to enable mobile wireless devices or STAs to discover the availability of information related to desired network services. For example, Generic Advertisement Service (GAS) enables discovery of information about services provided in an independent basic service set (IBSS), information about local access services, information from available Subscription Service Providers (SSP) and/or Subscription Service Provider Networks (SSPNs) or other external networks. Generic Advertisement Service (GAS) enables a wireless mobile device to transmit a Generic Advertisement Service (GAS) initial request frame to request information about network services from access points and it enables an access point to use a generic container, a Generic Advertisement Service (GAS) initial response frame, to advertise information about network services over an IEEE 802.11 network. Public Action frames are used to transport the Generic Advertisement Service (GAS) initial request frame and the Generic Advertisement Service (GAS) initial response frame.

The current procedures specified in the IEEE 802.11u amendment for the generic advertisement service (GAS) protocol, require that the mobile device issue a unicast GAS request separately to each access point (AP). Where there are dense networks with many access points, the mobile device may transmit many GAS requests, which will consume power and time. Additionally, the current procedures require a GAS response from all of the access points receiving a GAS request. This unicast information exchange may create a lot of traffic, which may be considered as a waste of bandwidth, since there may be responses transmitted from many access points that are not relevant at all for the roaming mobile device. Moreover, GAS may be considered a form of active scanning, and in some use cases, such as access points in an airport or train station where the flux and mobility of client devices is high, it may become burdensome for the access points to handle dozens of GAS requests e.g. every 20-30 seconds and there are client devices coming to and going out from the access point coverage as persons carrying client devices walk through the coverage of an access point.

In accordance with an example embodiment of the invention, as a response to GAS request access points provide GAS responses as broadcast transmissions, which enable any mobile wireless device within coverage area to listen to them during passive scanning. With this method, the scanning time may be reduced to the scan duration, itself, or T=Ts. The mobile wireless device may do network detection using GAS, without making GAS request transmissions, and thereby overloading the network. The mobile wireless device relies on other mobile wireless devices to make the GAS request, in effect collaborating with the other mobile wireless devices for effective network detection.

In accordance with an example embodiment of the invention, during passive scanning, mobile wireless devices, such as STAs may listen not only to beacons, but also to GAS responses sent to the broadcast address by the APs. From the listening (passive scanning) STAs' point of view, these responses may not have "specified characteristics", since the requests (which specify required characteristics of the APs) are placed by other STAs that are actively scanning. From the active scanning STA's point of view, the GAS responses will have the specified characteristics.

In accordance with an example embodiment of the invention, STAs may randomly decide whether they will perform active or passive scanning. For best performance (fastest network selection), a STA would typically do active scan. But, if all STAs did active scan, the network may become overloaded and slow down and all STAs may suffer. In accordance with an example embodiment of the invention, to avoid this situation from happening, some STAs may rely on other STAs to do active scanning. In accordance with an example embodiment of the invention, all GAS responses may be sent in broadcast mode. Thus, all STAs will receive the responses that are generated by APs as per the request from the active scanning STAs.

In accordance with an example embodiment of the invention, the STAs engage in a passive collaboration wherein since the STAs randomly decide whether to perform active or passive scanning, the ones doing passive scanning will rely on other STAs doing active scanning.

In accordance with an example embodiment of the invention, if no suitable GAS response was heard by the passive scanning STAs during the passive scanning period (Ts), for example because the characteristics in a GAS response do not match the required characteristics of the passively scanning STA or because no STA has performed active scanning, then the passive scanning STAs will go ahead and perform active scan after a time Ts, by generating GAS requests.

In accordance with an example embodiment of the invention, in order to collaborate with the other mobile wireless devices for effective network detection, a logic method is employed to determine when the mobile wireless device should perform active network detection by generating GAS requests, and when should it perform passive network detection by simply listening to broadcast GAS responses from the access points.

In accordance with an example embodiment of the invention, one example logic method is to use a random number generator: $y=R(x) \bmod z$, with R being the random number generator with a seed value input x (for example, device time), and z an integer (ranging from 1 to 10). Then, the mobile wireless device performs active scanning when the random number y compares with a selection value, for example y=2. If the random number y is not equal to the selection value of "2", then the mobile wireless device performs passive scanning for all other values of the random number. For example, if z is set to 3, then y has a value equal to 1 or 2 or 3. When y is equal to 2, the mobile wireless device performs active network detection, otherwise it performs passive network detection (roughly ⅓ of the time doing active detection and ⅔ of the time doing passive network detection). With some of the mobile wireless devices deciding to do active scanning and others deciding to do passive scanning, all mobile wireless devices may be able to detect broadcast GAS responses sent from the access points.

If the mobile wireless device needs to perform this type of scanning through a quantity of "c" channels, then the time needed for discovery is: $T=c \cdot Ts$, which is similar to conventional passive scanning, except that the mobile wireless devices not only detect the SSID of the access points, but a broadcast GAS response also provides network detection.

In accordance with an example embodiment of the invention, STAs decide to do active scanning by using a random number generator and feeding it with a random input value, for example the exact time of the device, and perform a modulo operation on the result. The divisor may be chosen by the STA based on the expected frequency of active scanning: If the expected frequency of active scanning is 1 in 4, then the divisor may be 4. The value of the divisor may be also chosen dynamically, based on the history of the operation at that specific location. For example, the more frequently the STA had to do active scan after passive scan, because the passive scan was not successful since a GAS response was not heard, the smaller will be the divisor.

FIG. 1A illustrates an example wireless network diagram of three mobile wireless devices STA1, STA2, and STA3 in communication range of two access points AP1 and AP2, wherein each of the mobile wireless devices wishes to connect to one of the available access points and needs to discover whether any of the access points available at the current location have one or more required characteristics. The figure shows each of the three mobile wireless devices STA1, STA2, and STA3 determining whether to perform passive or active scanning for an access point by making a random choice of one or the other scanning mode, in accordance with an example embodiment of the invention. The access point AP1 has the characteristics "X" and the access point AP2 has the characteristics "Y".

FIG. 1B illustrates the example wireless network diagram of FIG. 1A, showing the result each STA1, STA2, and STA3 device's determination, wherein one of the mobile wireless devices STA2 has randomly chosen the active scanning mode and the other two mobile wireless devices STA1 and STA3 have randomly chosen the passive scanning mode, in accordance with an example embodiment of the invention.

Figure 1C:
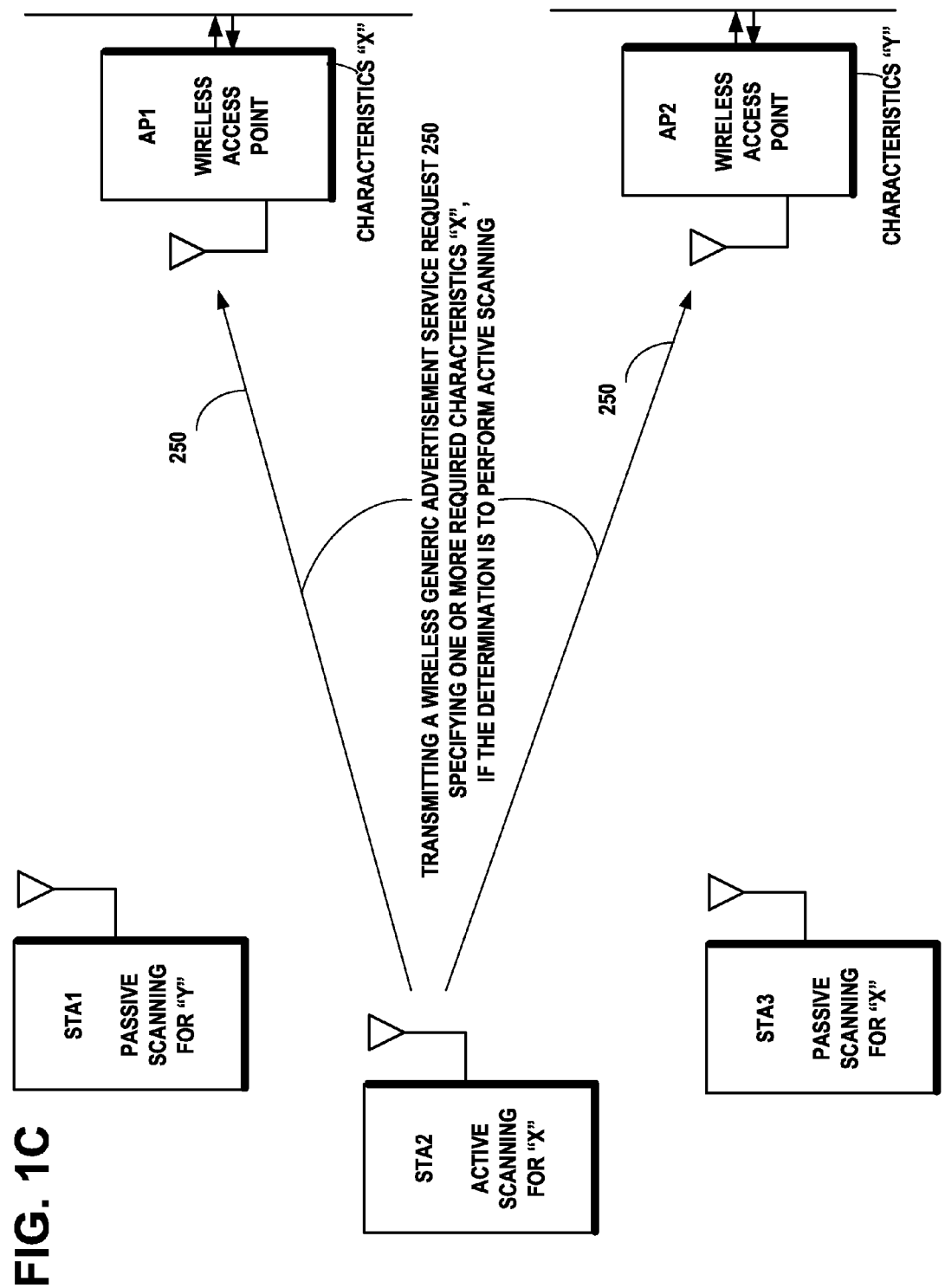
FIG. 1C illustrates the example wireless network diagram of FIG. 1B, wherein the one of the mobile wireless devices that has randomly chosen the active scanning mode, is shown transmitting a wireless generic advertisement service (GAS) request specifying the one or more required characteristics "X". The figure shows the other two mobile wireless devices that have randomly chosen the passive scanning mode, passively listening for one or more wireless generic advertisement service (GAS) responses addressed to a broadcast address, from one or more of the access points, in accordance with an example embodiment of the invention.

FIG. 1C illustrates the example wireless network diagram of FIG. 1B, wherein the one of the mobile wireless devices STA2 that has randomly chosen the active scanning mode, is shown transmitting a wireless generic advertisement service (GAS) request 250 specifying the one or more required characteristics "X". STA2 is shown transmitting a wireless generic advertisement service request 250 specifying one or more required characteristics "X" of itself as the transmitting device, since its determination is to perform active scanning. The figure shows the other two mobile wireless devices STA1 and STA3 that have randomly chosen the passive scanning mode, passively listening for one or more wireless generic advertisement service (GAS) responses 260 addressed to a broadcast address, from one or more of the access points AP1 and AP2, in accordance with an example embodiment of the invention. STA1 and STA3 are shown passively listening for one or more wireless generic advertisement service responses sent to a broadcast address by one or more wireless devices AP1 and AP2. The responses they are listening for should include one or more required characteristics of the passive listening device. STA1 will be listening for characteristics "Y" and STA3 will be listening for characteristics "X".

FIG. 1D illustrates the example wireless network diagram of FIG. 1C, wherein each of the three mobile wireless devices STA1, STA2, and STA3 is shown receiving one or more wireless generic advertisement service (GAS) responses 260 (1) from one of the access points that has the one or more required characteristics "X", sent to a broadcast address, from the access point AP1, in accordance with an example embodiment of the invention.

FIG. 1E illustrates the example wireless network diagram of FIG. 1D, wherein the mobile wireless device STA2 in the active scanning mode is able to match the characteristics "X" received in the generic advertisement service responses 260 (1), with its required characteristics that were specified in the transmitted request 250. One of the mobile wireless devices STA3 in the passive scanning mode is able to match the characteristics "X" received in the generic advertisement service responses 260(1), with its required characteristics "X". The other of the mobile wireless device STA1 in the passive scanning mode is not able to match the characteristics "X" received in the generic advertisement service responses 260 (1), with its required characteristics "Y", in accordance with an example embodiment of the invention.

Figure 1F:
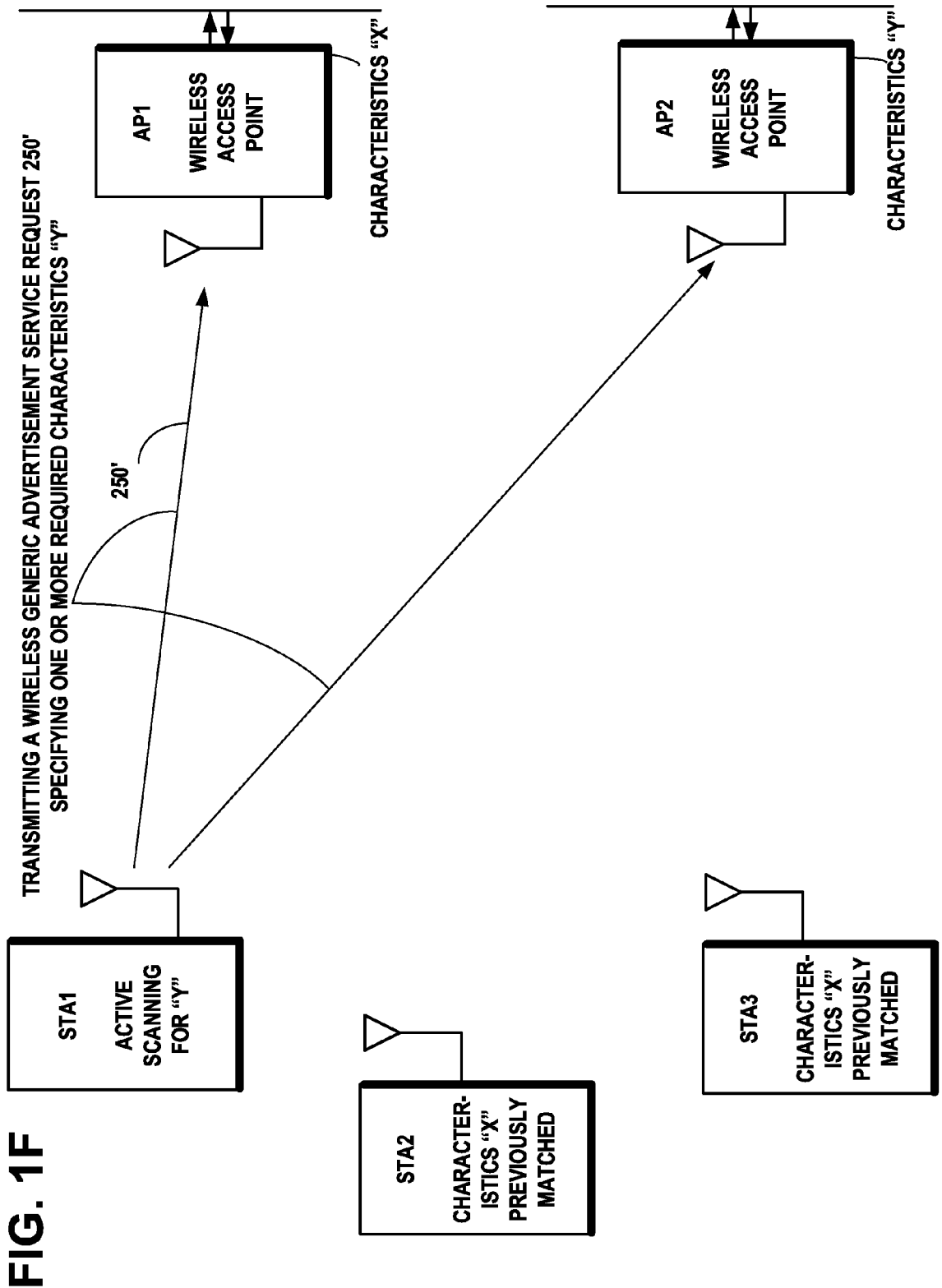
FIG. 1F illustrates the example wireless network diagram of FIG. 1E, wherein the other of the mobile wireless device that was in the passive scanning mode and was not able to match the characteristics "X" received in the generic advertisement service responses, with its required characteristics "Y", performs active scanning by transmitting a wireless generic advertisement service request specifying one or more required characteristics "Y", in accordance with an example embodiment of the invention.

FIG. 1F illustrates the example wireless network diagram of FIG. 1E, wherein the other of the mobile wireless device STA1 that was in the passive scanning mode and was not able to match the characteristics "X" received in the generic advertisement service responses, with its required characteristics "Y", performs active scanning by transmitting a wireless generic advertisement service request 250' specifying one or more required characteristics "Y", in accordance with an example embodiment of the invention.

Figure 1G:
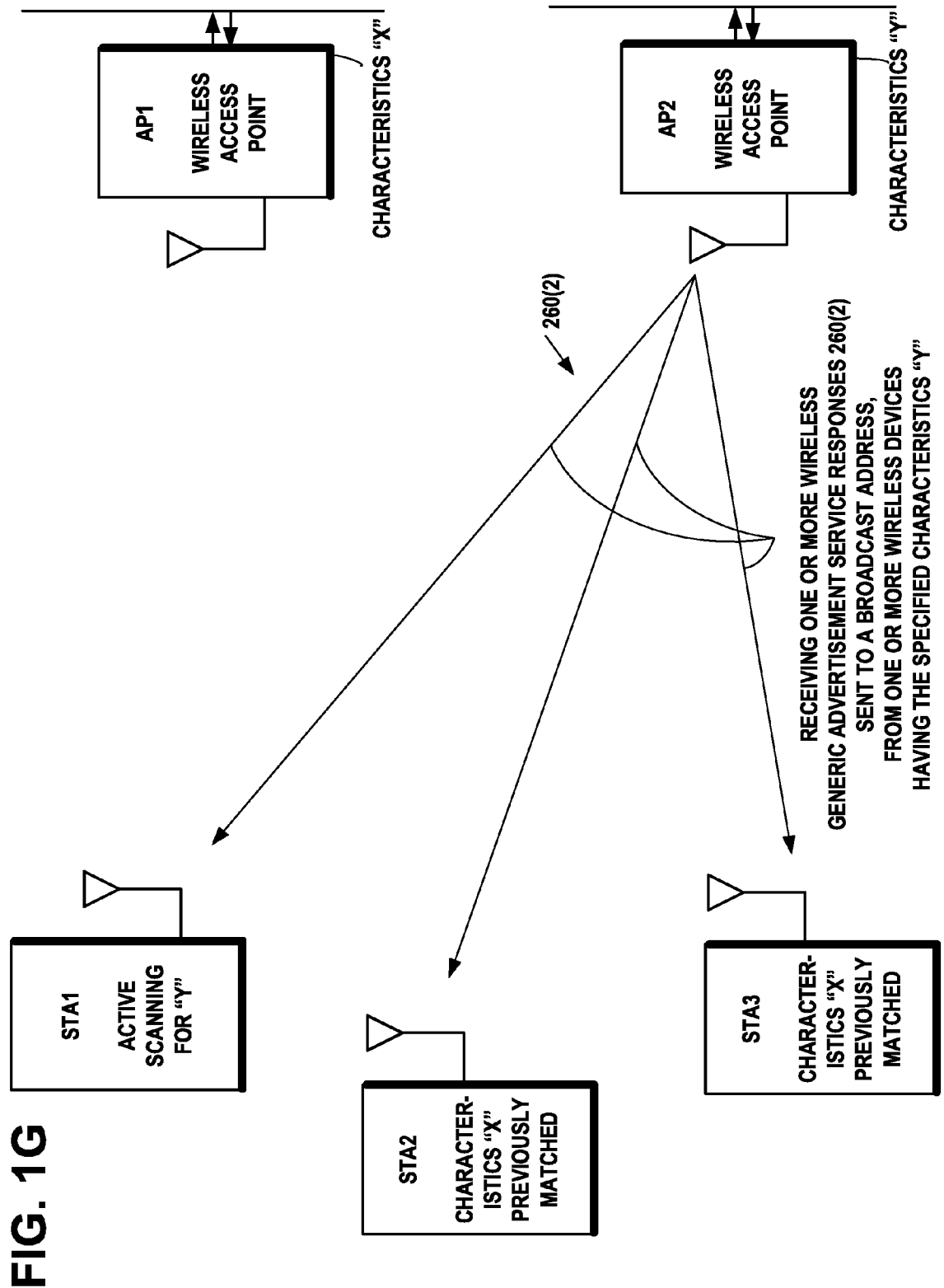
FIG. 1G illustrates the example wireless network diagram of FIG. 1F, wherein each of the three mobile wireless devices is shown receiving one or more wireless generic advertisement service (GAS) responses sent to a broadcast address, from one of the access points that has the one or more required characteristics "Y", in accordance with an example embodiment of the invention.

FIG. 1G illustrates the example wireless network diagram of FIG. 1F, wherein each of the three mobile wireless devices STA1, STA2, and STA3 is shown receiving one or more wireless generic advertisement service (GAS) responses 260 (2) sent to a broadcast address, from one of the access points AP2 that has the one or more required characteristics "Y", in accordance with an example embodiment of the invention.

FIG. 1H illustrates the example wireless network diagram of FIG. 1G, wherein the other of the mobile wireless device STA1 in the passive scanning mode is able to match the characteristics "Y" received in the generic advertisement service responses 260(2), with its required characteristics "Y", in accordance with an example embodiment of the invention.

Figure 2A:
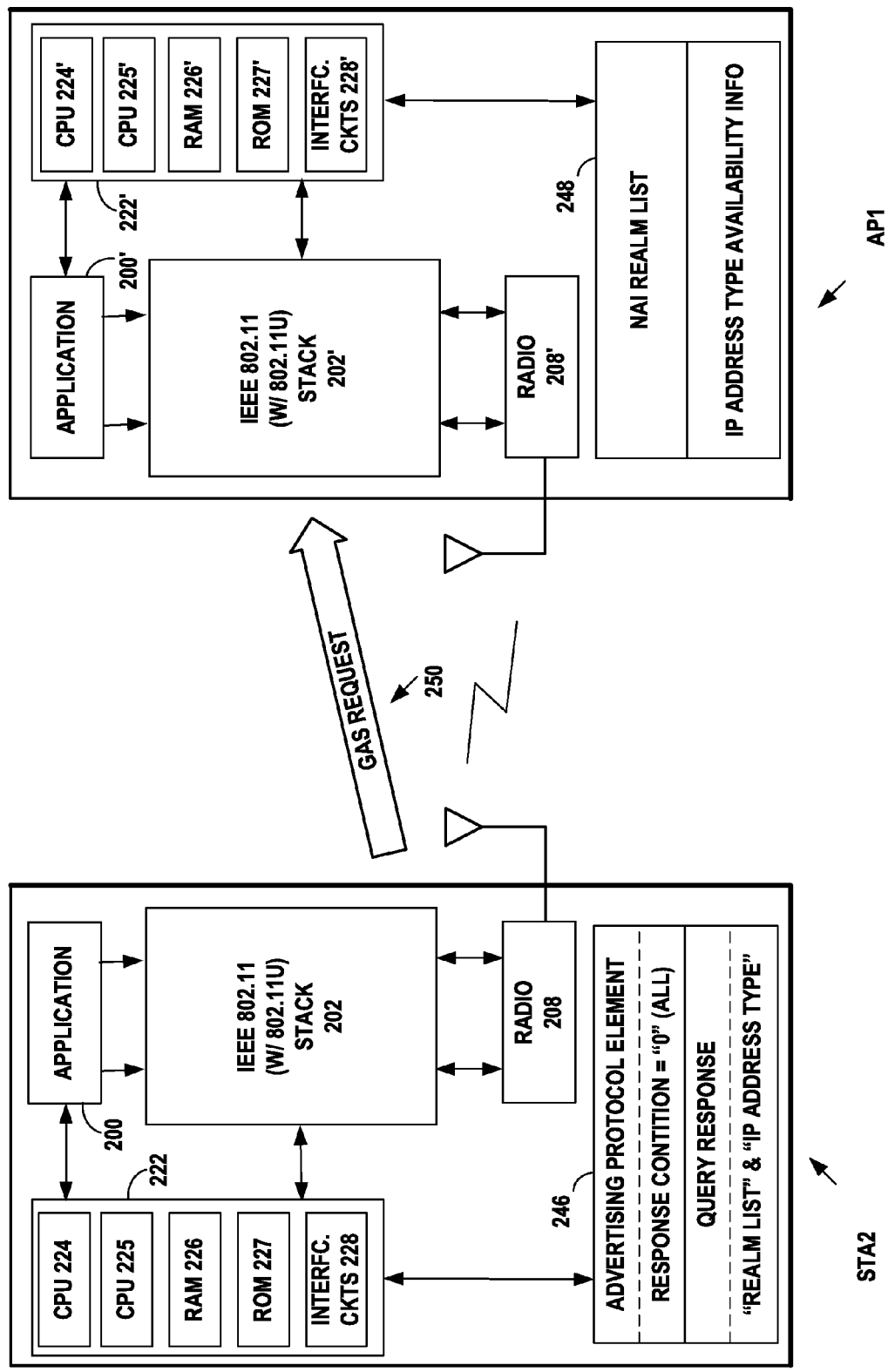
FIG. 2A illustrates an example wireless network and functional block diagram of the mobile wireless device and the access point, with the mobile wireless device transmitting a generic advertisement service (GAS) request frame, in accordance with an example embodiment of the invention.

FIG. 2A illustrates an example wireless network and functional block diagram of the mobile wireless device STA2 and the access point AP1, with the mobile wireless device transmitting a generic advertisement service (GAS) request frame 250, in accordance with an example embodiment of the invention. The mobile wireless device STA2 may broadcast a generic advertisement service (GAS) initial request frame 250, as shown in FIG. 2A. The generic advertisement service (GAS) initial request frame 250 requests whether any access point within range as a required characteristic of possessing an NAI realm list, to enable determining whether the responding access point belongs to a network having a roaming agreement with STA2's home realm A. The request also requests whether any access point within range as a required characteristic of possessing IP address type availability information. The generic advertisement service (GAS) initial request frame 250 may also contain a response condition that all of the required characteristics that it requests must be possessed by an access point receiving the request 250, before that access point may respond to the request 250 by sending the requested information.

Figure 2B:
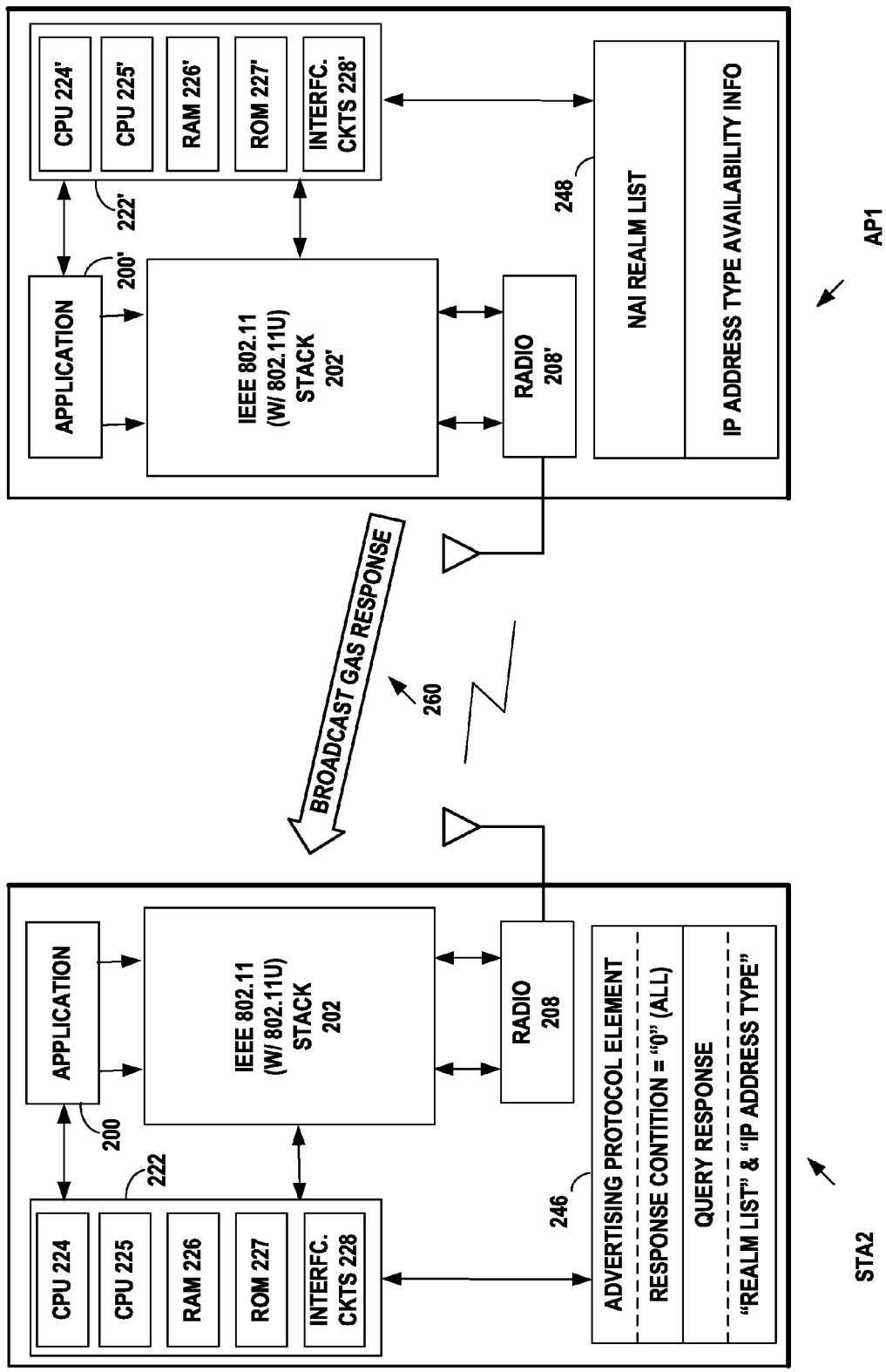
FIG. 2B illustrates the example wireless network and functional block diagram of FIG. 2A, of the mobile wireless device and the access point, with the access point transmitting a generic advertisement service (GAS) response frame, sending it to a broadcast address, in accordance with an example embodiment of the invention.

FIG. 2B illustrates the example wireless network and functional block diagram of FIG. 2A, of the mobile wireless device and the access point, with the access point transmitting a generic advertisement service (GAS) response frame, sending it to a broadcast address, in accordance with an example embodiment of the invention. FIG. 2B illustrates the example wireless network and functional block diagram of FIG. 2A, of the mobile wireless device STA2 and the access point AP1, with the access point AP1 transmitting a generic advertisement service (GAS) initial response frame 260 sent to a broadcast address, in accordance with an example embodiment of the invention.

In accordance with an example embodiment of the invention, the mobile wireless device STA2 and the access point AP1 are shown in FIGS. 2A and 2B in functional block diagram form to illustrate an example embodiment of their components. The wireless access point AP1 may include a processor 222', which includes a single core CPU or multiple core central processing unit (CPU) 224' and 225', a random access memory (RAM) 226', a read only memory (ROM) 227', and interface circuits 228' to interface with one or more radio transceivers 208', battery or house power sources, keyboard, display, etc. The RAM and ROM may be removable memory devices such as smart cards, SIMs, WIMs, semiconductor memories such as RAM, ROM, PROMS, flash memory devices, etc.

In accordance with an example embodiment of the invention, the mobile wireless device STA2 may include a processor 222, which includes a dual core central processing unit 224 and 225, a random access memory (RAM) 226, a read only memory (ROM) 227, and interface circuits 228 to interface with one or more radio transceivers 208, battery and other power sources, key pad, touch screen, display, microphone, speakers, ear pieces, camera or other imaging devices, etc. in the mobile wireless device STA2. The RAM and ROM may be removable memory devices such as smart cards, SIMs, WIMs, semiconductor memories such as RAM, ROM, PROMS, flash memory devices, etc.

In accordance with an example embodiment of the invention, an example embodiment of the IEEE 802.11 protocol stack may include the IEEE 802.11u protocol 202 in the mobile wireless device STA2. An example embodiment of the IEEE 802.11 protocol stack may include the IEEE 802.11u protocol 202' in the access point device AP1. The protocol stacks 202 and 202' may be computer code instructions stored in the RAM and/or ROM memory of the respective processors 222 and 222', which when executed by the central processing units (CPU), carry out the functions of the example embodiments of the invention.

In an example embodiment of the mobile wireless device STA2, a buffer 246 may contain the advertising protocol element field and the query response field. The advertising protocol element field may have a response condition="0", requiring that all required characteristics listed in the query response field, "REALM LIST" and "IP ADDRESS TYPE", must be returned in a GAS initial response 260 by any access point receiving the GAS initial request 250.

In an example embodiment of the wireless access point AP1, a buffer 248 may contain required characteristics, including the "NAI Realm List" and the "IP Address Type Availability Information". If these required characteristics match the requirements in the advertising protocol element field and the query response field of the received GAS initial request 250, then the AP1 may transmit the GAS initial response 260 with the required characteristics, sent to a broadcast address.

FIG. 3A illustrates an example frame body format of the Generic Advertisement Service (GAS) Initial Request Frame, in accordance with an example embodiment of the invention. The IEEE 802.11 MAC management frame 302 shown in FIG. 3A may have the frame control field indicate that this is a management frame, the frame type and subtype fields are set to indicate an action frame. The frame body the category field that may indicate a public action frame to allow communications between an access point and an unassociated STA. The public action field 304 may be set to one of several values indicated in the table 306. An action field value of 10 may indicate a GAS Initial Request, transmitted by a requesting STA to request information from another STA.

In accordance with an example embodiment of the invention, as shown in FIG. 3A, when the public action field 304 is set to value of 10 to indicate GAS initial request 250, several access network query protocol (ANQP) information elements 308 may be sent in the query request field. For example, the information field of the ANQP element 308A contains the response condition, such as "0"="all to be met" or "1"="one is enough". The ANQP elements 308B and 308C respectively contain the query request "263"="realm list" and "262"="IP address type" sent from the mobile wireless device STA2 to the access point AP1. The dialog token field is set by the requesting station with any value, such as "123", to identify the GAS initial request frame. The GAS initial request frame 250 includes a length value for the length of the following query request field. The Generic Advertisement Service (GAS) initial request frame 250 may be used for interworking between wireless networks in different realms.

Figure 3B:
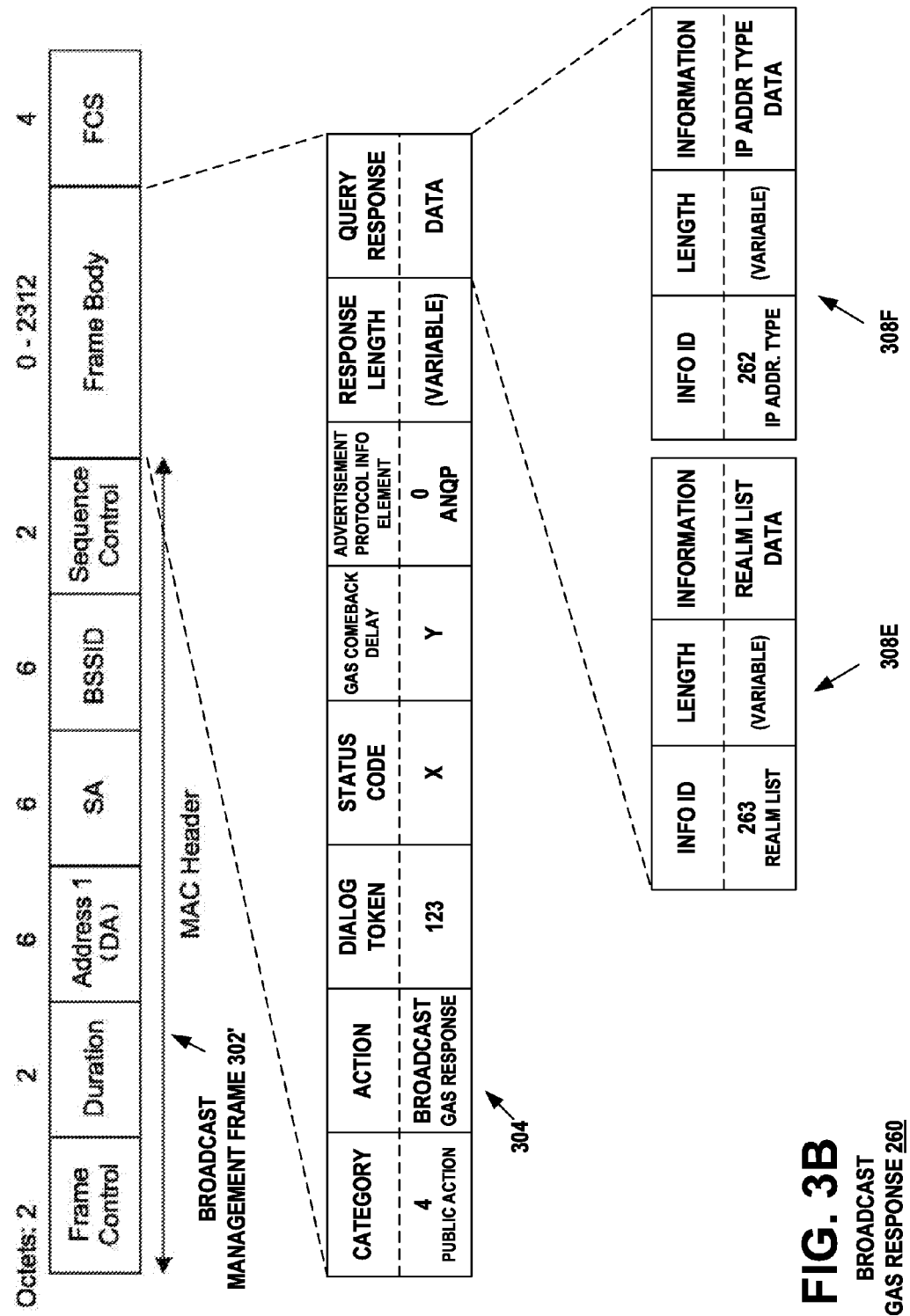
FIG. 3B illustrates an example frame body format of the Generic Advertisement Service (GAS) Initial Response Frame, sent to a broadcast address, in accordance with an example embodiment of the invention.

FIG. 3B illustrates an example frame body format of the Generic Advertisement Service (GAS) Initial Response Frame, sent to a broadcast address, in accordance with an example embodiment of the invention. The Generic Advertisement Service (GAS) initial response frame 260 may be used for interworking procedure in wireless local access network. The GAS initial response frame 260 shown in FIG. 3B, may include a category field that is set to a value of 4 indicating a public action frame. The GAS initial response frame 260 shown in FIG. 3B, may include an action field 304 that is set to a value of "Broadcast" indicating a GAS initial response action sent to a broadcast address. The GAS initial response frame 260 shown in FIG. 3B, may include a dialog token field which is set to a value, such as "123", identical to the corresponding value in the GAS initial request frame, to enable relating the response frame to the request frame. The GAS initial response frame 260 shown in FIG. 3B, may include a comeback delay value field.

In accordance with an example embodiment of the invention, the Generic Advertisement Service (GAS) Initial Response Frame 260 may be sent to a broadcast address. The public action field 304 value may be set to value of "Broadcast" to indicate a GAS initial response 260 that is sent to a broadcast address. As shown in FIG. 3B, when the public action field 304 is set to value of "Broadcast" to indicate GAS initial response 260, several ANQP information elements 308 may be sent in the query response field. The ANQP elements 308E and 308F may respectively contain the query response data "263" for the realm list data and "262" for the IP address type data, that is sent from the access point AP1 to the mobile wireless device STA2. The information field of the ANQP elements 308E and 308F may contain the requested data sent from the access point API, which may be in one or multiple ANQP info elements 308.

FIGS. 4A(1) and 4A(2) illustrate an example flow diagram of operational steps of an example embodiment of the procedure performed in the mobile wireless device, according to an embodiment of the present invention. FIGS. 4A(1) and 4A(2) illustrate an example embodiment of a flow diagram 400 for the process in any of the mobile wireless devices STA1, STA2, or STA3. FIGS. 4A(1) and 4A(2) illustrate an example of steps in the procedure carried out by the device in executing-in-place program code stored in the memory of the device. The steps in the procedure of the flow diagram may be embodied as program logic stored in the memory of the wireless device in the form of sequences of programmed instructions which, when executed in the microprocessor control logic of the device, carry out the functions of an exemplary disclosed embodiment. The steps may be carried out in another order than shown and individual steps may be combined or separated into component steps. Additional steps may be inserted into this sequence. The steps in the procedure are as follows:

In FIG. 4A(1):

Step 402: determining, at a wireless device, whether to perform passive or active scanning;

Step 403: if the determination was to perform active scanning, then go to Step 404 if TRUE or else go to Step 416 of FIG. 4A(2) if FALSE.

Step 404: transmitting a wireless generic advertisement service request specifying one or more required characteristics of a transmitting device, if the determination is to perform active scanning;

Step 408: receiving one or more wireless generic advertisement service responses sent to a broadcast address, from one or more wireless devices having the characteristics specified in the transmitted request.

In FIG. 4A(2):

if the determination of Step 403 was FALSE, then go to Step 416;

Step 416: passively listening for one or more wireless generic advertisement service responses sent to a broadcast address by one or more wireless devices, the responses including one or more required characteristics of a passive listening device, if the determination is to perform passive scanning;

Step 418: receiving one or more wireless generic advertisement service responses sent to a broadcast address, from one or more wireless devices having the characteristics specified in the transmitted request.

Step 420: transmitting a wireless generic advertisement service request specifying one or more required characteristics of a transmitting device, if no suitable GAS broadcast response was received during passive scanning;

Step 422: receiving one or more wireless generic advertisement service responses sent to a broadcast address, from one or more wireless devices having the characteristics specified in the transmitted request.

FIG. 4B is an example flow diagram of operational steps of an example embodiment of the procedure performed in the access point device, according to an embodiment of the present invention. FIG. 4B illustrates an example embodiment of a flow diagram 450 for the process in the access point device AP1. FIG. 4B is an example of steps in the procedure carried out by the device in executing-in-place program code stored in the memory of the device. The steps in the procedure of the flow diagram may be embodied as program logic stored in the memory of the wireless device in the form of sequences of programmed instructions which, when executed in the microprocessor control logic of the device, carry out the functions of an exemplary disclosed embodiment. The steps may be carried out in another order than shown and individual steps may be combined or separated into component steps. Additional steps may be inserted into this sequence. The steps in the procedure are as follows:

Step 452: receiving a wireless generic advertisement service request specifying one or more required characteristics; and Step 454: transmitting one or more wireless generic advertisement service responses to a broadcast address, based on having the specified characteristics.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable, non-transitory medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention. For instance, the features described herein may be employed in networks other than Wireless LAN networks.

What is claimed is:

1. A method, comprising:
    determining, at a wireless device, whether to perform passive or active scanning;
    transmitting a wireless generic advertisement service request specifying one or more required characteristics of a transmitting device, if the determination is to perform active scanning;
    passively listening for one or more wireless generic advertisement service responses sent to a broadcast address by one or more wireless devices, the responses including one or more required characteristics of a passive listening device, if the determination is to perform passive scanning; and
    receiving one or more wireless generic advertisement service responses sent to a broadcast address by one or more wireless devices having the characteristics specified in the transmitted request;
    wherein said determining further comprises:
    creating a random value;
    comparing the random value with a selection value; and
    choosing whether to perform passive or active scanning based on the comparison of the random value with the selection value.

2. An apparatus, comprising:
    at least one processor;
    at least one memory including computer program code;
    the at least one memory and the computer program code configured to, with the at least one processor, cause the apparatus at least to:
    determine whether to perform passive or active scanning;
    transmit a wireless generic advertisement service request specifying one or more required characteristics of a transmitting device, if the determination is to perform active scanning;
    passively listen for one or more wireless generic advertisement service responses sent to a broadcast address by one or more wireless devices, the responses including one or more required characteristics of a passive listening device, if the determination is to perform passive scanning; and
    receive one or more wireless generic advertisement service responses sent to a broadcast address by one or more wireless devices having the characteristics specified in the transmitted request;
    wherein said determining further comprises:
    the at least one memory and the computer program code configured to, with the at least one processor, cause the apparatus at least to:
    create a random value;
    compare the random value with a selection value; and
    choose whether to perform passive or active scanning based on the comparison of the random value with the selection value.

3. A method, comprising:
    determining, at a wireless device, whether to perform passive or active scanning;
    transmitting a wireless generic advertisement service request specifying one or more required characteristics of a transmitting device, if the determination is to perform active scanning;
    passively listening for one or more wireless generic advertisement service responses sent to a broadcast address by one or more wireless devices, the responses including one or more required characteristics of a passive listening device, if the determination is to perform passive scanning;
    receiving one or more wireless generic advertisement service responses sent to a broadcast address by one or more wireless devices having the characteristics specified in the transmitted request;
    creating a random value with a random value a random number generator $y=R(x) \bmod z$, with R being the random number generator with a seed value input x, and z an integer;
    performing active scanning when the random number y compares with a selection value; and
    if the random number y is not equal to the selection value, then performing passive scanning for all other values of the random number.

4. An apparatus, comprising:
    at least one processor;
    at least one memory including computer program code;

the at least one memory and the computer program code configured to, with the at least one processor, cause the apparatus at least to:

determine whether to perform passive or active scanning;

transmit a wireless generic advertisement service request specifying one or more required characteristics of a transmitting device, if the determination is to perform active scanning;

passively listen for one or more wireless generic advertisement service responses sent to a broadcast address by one or more wireless devices, the responses including one or more required characteristics of a passive listening device, if the determination is to perform passive scanning;

receive one or more wireless generic advertisement service responses sent to a broadcast address by one or more wireless devices having the characteristics specified in the transmitted request;

create a random value with a random value a random number generator $y=R(x) \bmod z$, with R being the random number generator with a seed value input x, and z an integer;

perform active scanning when the random number y compares with a selection value; and if the random number y is not equal to the selection value, then perform passive scanning for all other values of the random number.

5. A computer program product comprising computer executable program code recorded on a computer readable, non-transitory storage medium, the computer executable program code, when executed by a computer processor, comprising:

code for determining, at a wireless device, whether to perform passive or active scanning;

code for transmitting a wireless generic advertisement service request specifying one or more required characteristics of a transmitting device, if the determination is to perform active scanning;

code for passively listening for one or more wireless generic advertisement service responses sent to a broadcast address by one or more wireless devices, the responses including one or more required characteristics of a passive listening device, if the determination is to perform passive scanning;

code for receiving one or more wireless generic advertisement service responses sent to a broadcast address by one or more wireless devices having the characteristics specified in the transmitted request;

code for creating a random value with a random value a random number generator $y=R(x) \bmod z$, with R being the random number generator with a seed value input x, and z an integer;

code for performing active scanning when the random number y compares with a selection value; and code for if the random number y is not equal to the selection value, then performing passive scanning for all other values of the random number.

* * * * *